(12) United States Patent
Graf et al.

(10) Patent No.: US 8,690,417 B2
(45) Date of Patent: Apr. 8, 2014

(54) METHOD FOR THE INTERMITTENT PRODUCTION AND CONTINUOUS SUPPLY OF A RESIN-FILLER MIXTURE IN THE COURSE OF THE PRODUCTION OF PLASTIC MOLDED PARTS

(75) Inventors: Matthias Graf, Bretten (DE); Jochen Keitel, Ittlingen (DE)

(73) Assignee: Dieffenbacher GmbH Maschinen- und Anlagenbau, Eppingen (DE)

( * ) Notice: Subject to any disclaimer, the term of this patent is extended or adjusted under 35 U.S.C. 154(b) by 355 days.

(21) Appl. No.: 12/662,005

(22) Filed: Mar. 26, 2010

(65) Prior Publication Data

US 2010/0317769 A1    Dec. 16, 2010

(30) Foreign Application Priority Data

Mar. 29, 2009  (DE) .................. 10 2009 014 363

(51) Int. Cl.
*B29B 7/88* (2006.01)

(52) U.S. Cl.
USPC ........... 366/76.2; 366/76.6; 366/91; 366/141; 366/155.1; 425/586

(58) Field of Classification Search
USPC .................. 523/303; 425/200–209, 586–587; 366/76.1, 76.2, 76.3, 76.4, 76.6, 76.9, 366/76.91, 76.92, 76.93, 79–91, 141, 154.1, 366/155.1, 156.1, 158.4, 183.1
See application file for complete search history.

(56) References Cited

U.S. PATENT DOCUMENTS

| | | | | |
|---|---|---|---|---|
| 4,014,462 A | * | 3/1977 | Robertson | 222/136 |
| 4,707,139 A | * | 11/1987 | Valenzky et al. | 366/77 |
| 5,048,405 A | * | 9/1991 | Takahashi et al. | 99/470 |
| 5,110,521 A | * | 5/1992 | Moller | 264/40.4 |
| 5,198,171 A | | 3/1993 | Kasahara et al. | |
| 5,267,847 A | * | 12/1993 | Bohm et al. | 425/145 |
| 5,282,548 A | * | 2/1994 | Ishihara | 222/55 |
| 5,433,593 A | * | 7/1995 | Berger | 425/186 |
| 7,137,802 B2 | * | 11/2006 | Bacher et al. | 425/217 |
| 7,607,818 B2 | * | 10/2009 | Uphus | 366/77 |

(Continued)

FOREIGN PATENT DOCUMENTS

| | | |
|---|---|---|
| DE | 40 23 100 A1 | 1/1992 |
| DE | 199 39 042 A1 | 3/2001 |

(Continued)

OTHER PUBLICATIONS

European Office Action in connection with European Application No. 10003374.5 (with machine translation); dtd Oct. 30, 2012.

(Continued)

*Primary Examiner* — Charles E Cooley
(74) *Attorney, Agent, or Firm* — Foley & Lardner LLP

(57) ABSTRACT

A method for intermittent production and continuous supply of a resin-filler mixture in the course of production of plastic molded parts and an installation for intermittent production and continuous supply of a resin-filler mixture. A method and an installation, by which it is possible to ensure a continuous supply of a resin-filler mixture reliably and in continuous operation, an optimum and precise mixing ratio of the individual constituents of a resin-filler mixture, mostly consisting of a resin mixture and fillers, in which components, particularly portions of very small or highly viscous components, are dispersed finely and uniformly. Optimizing the production of resin-filler mixture for the supply of small components and achieving a continuous supply of the resin mixture that is reliable for continuous operation occurs.

15 Claims, 4 Drawing Sheets

(56) References Cited

U.S. PATENT DOCUMENTS

| | | | |
|---|---|---|---|
| 7,810,986 B2* | 10/2010 | Landers et al. | 366/76.91 |
| 8,562,204 B2* | 10/2013 | Konermann | 366/141 |
| 2004/0219247 A1* | 11/2004 | Bacher et al. | 425/215 |
| 2005/0287237 A1* | 12/2005 | Bacher et al. | 425/217 |
| 2008/0290537 A1* | 11/2008 | Bacher et al. | 264/37.1 |
| 2009/0004325 A1* | 1/2009 | Bacher et al. | 425/586 |
| 2010/0317769 A1* | 12/2010 | Graf et al. | 524/1 |

FOREIGN PATENT DOCUMENTS

| | | |
|---|---|---|
| DE | 102 33 300 A1 | 2/2004 |
| DE | 102005 042 383 A1 | 3/2007 |
| DE | 10 2006 0 62 622 A1 | 7/2008 |
| EP | 0 254 668 A2 | 1/1988 |
| EP | 0 309 410 A2 | 3/1989 |
| JP | 05-042531 A | 2/1993 |
| WO | WO 9322119 A1 * | 11/1993 |

OTHER PUBLICATIONS

European Search Report and Written Opinion in connection with European Patent Application No. 10003374.5 (with machine translation); dtd Feb. 10, 2012.

* cited by examiner

METHOD FOR THE INTERMITTENT PRODUCTION AND CONTINUOUS SUPPLY OF A RESIN-FILLER MIXTURE IN THE COURSE OF THE PRODUCTION OF PLASTIC MOLDED PARTS

CROSS-REFERENCE TO RELATED PATENT APPLICATIONS

Germany Priority Application DE 10 2009 014 363.7, filed Mar. 29, 2009 including the specification, drawings, claims and abstract, is incorporated herein by reference in its entirety.

BACKGROUND

1. Field of Embodiments

The embodiments relate generally to a method and an installation for the intermittent production and continuous supply of a resin-filler mixture in the course of the production of plastic molded parts.

2. Description of Related Art

On account of their good mechanical properties and favorable prices, plastic molded parts and particularly molded parts produced from fiber-reinforced thermosetting plastics (SMC) are the most widely used thermosetting fiber-reinforced plastics in the plastics-processing industry. Until now, a type of raw material (semi-finished product) made of a resin compound (resin formulation) comprising embedded fillers and chopped or broken (or finitely long) glass fibers was initially manufactured for the production of SMC parts. The resin-filler mixture (resin formulation comprising fillers) is applied to thin plastic films (backing films), and the broken, chopped or finitely long fibers are deposited in the space between the plastic films.

After a fulling section used for an improved wetting of the fibers, the semi-finished product passes through a maturing process before it can be processed into the component. The usual maturing process takes three to five days and serves, inter alia, for thickening the mixture. The resin formulation itself usually consists of resins, thermoplastic solutions, additives for improving the material properties, integrated parting agents, inhibitors and optionally additional additives for modifying defined properties and a hardener.

The resin formulation is stirred at a predetermined temperature range to form a well-dispersed liquid, provided with mineral fillers, and supplemented at the SMC-production plant with a thickening agent in powder or liquid form, shortly before being applied to the films. The resin-filler mixture is then applied with doctor knives to the lower and upper backing films and adjusted in terms of thickness. The chopped glass, endless rovings, for example, can be applied in proper amounts to the resin-filler mixture layer of the lower backing film by means of chopping units. Thereafter, the upper backing film that is likewise provided with the resin-filler mixture is laid onto the chopped fiber coat and the lower layer. In a fulling process that follows, the fibers are mixed/saturated with the resin-filler mixture and then wound onto a roll as a sheet molding compound or stored intermediately as a flat semi-finished product for the maturing process. The maturing process usually makes the resin-filler mixture so strong that the backing films can be peeled off without leaving any residue. After or during the maturing period, blanks are cut from the flat semi-finished product or rolls to correspond to the molded part being produced, and they are placed and pressed singly or in layered packs in a molding press. The disadvantage of this method is that the SMC semi-finished product is produced in batch quantities and can be processed only after a maturing period lasting several hours or several days, as a result of which material inconsistencies and high storage and management costs are incorporated into the total production costs of a semi-finished product.

Another disadvantage is that the stored sheet molding compounds or the resin formulation wound on a roll can become distorted during the maturing process. If the roll lies on the floor, the bottom SMC layers are pressed and the material is thus displaced sideward. If the rolls are suspended on a shaft, the negative effect during maturation is the opposite: the material flows downward in the direction of the gravitational force and the web layers in the bottom part of the roll can have greater weights per unit area than the upper web layers. The unavoidable different weights per unit area, cause manufacturers to not only cut the sheet molding compounds lengthwise before the pressing operation, but also to weigh the sheet molding compounds to achieve equal bulk and thus equal part density for each part to be produced. If the weights per unit area of the webs were constant, the necessary SMC web pieces could be cut automatically with a length gauge, which would considerably reduce production costs and improve the quality of the molded parts. The composition of the cut blanks varying in thickness is also the reason why the production of SMC molded parts has never before been satisfactorily automated. Another disadvantage of the former SMC production is to be seen in the non-reusable backing films, which is another cost factor in the manufacturing process.

DE 102 33 300 A1 discloses a method and an apparatus that attempts to minimize the disadvantage of storage and use of film in that an encapsulated continuous thickening unit is disposed for the resin formulation after the production zone. The resin formulation is continuously guided between two endless belts and made to mature completely as it idles in the continuous thickening unit. The method and the apparatus are usable, in principle. However, the disadvantage of the prior art cited above is that it constantly necessitates an additional storage and maturation device that entails investment, operating and naturally maintenance costs that in turn increase the total production costs. Also, not all variants of SMC-formulations can be conveyed on the above apparatus since the admixture and mixing of all additives and reactants in the resin used repeatedly pose problems for the industry, which require expensive solutions and process engineering. In part, additives are admixed in proportions of 1:1000 (1 milliliter to 1 liter) or less. The ratio is even more extreme when additives have to be admixed after the admixture of fillers to the resin, and the problem of an absolutely uniform mixture also remains unresolved.

In principle, it can be noted that a generic resin is not used for the production of SMC components, but instead the resin production must correspond to the component to be produced in each case since the buyer can place other requirements depending on the component. Extreme conflicting examples in this case include plastic bumpers on a motor vehicle and an interior trim panel to be laminated such as the dashboard in a motor vehicle. Accordingly, it would be advantageous if the producer responsible could adjust and produce the material type of the plastic using simple means before the pressing operation, and need not laboriously produce or order the corresponding material days or weeks in advance. Furthermore, it is possible to detect errors in the formulations in the immediately subsequent component production and to readjust the installation engineering, whereas entire batches are present in the form of rejects in the case of matured systems based on semi-finished products.

DE 10 2006 062 622 A1 discloses a method and a device for the production of a resin mixture in the course of the production of plastic molded parts, particularly fiber-reinforced plastic-molded parts (SMC), in the uninterruptible direct process, the individual portions of a fluid main component being added and mixed for the production of the resin mixture. For this purpose, two mixing circuits are implemented each of which has a dynamic mixing zone and a subsequent static mixer. In a rotating circulation system, a dynamic mixing zone comprising one or more peristaltic pumps comprising injection nozzles for the circulation system, a pump, a static mixer and an overflow outlet that is intended for the premix and is made of a connection to the second mixing circuit are disposed in series in the first mixing circuit, and a dynamic mixing zone comprising one or more peristaltic pumps and/or gear pumps, a pump, a static mixer and an overflow outlet comprising a connection for the transfer of the resin mixture to the extruder are disposed in series in the second mixing circuit, the extruder comprising a supply inlet for fillers and reinforcing fibers. The solution suggested here has basically proved useful, but leaves scope for improvement.

In principle, the disadvantage of all methods and devices used in the mixing of formulation components, particularly in SMC production, by means of pumps is that highly viscous liquids and also very small quantities cannot be metered in accordance with the specifications. Critical metering differences can result in different properties in the further processing in the extruder or in a press or reduce the shelf life until further processing and thus lead to unusable material. Furthermore, at least one portion, if not more, of the liquids to be metered is fire-prone or explosion-prone during the heating process and requires high safety-related and accident prevention expenditure. In addition, volatile portions with features rendering them disadvantageous for handling are also to be found.

The additional problem confronted in rotating circuit mixers is that components are continuously supplied and resin mixture is continuously discharged due to the characteristics of the system, and reactive constituents can stay for a long duration in the mixing zone and lose their reactivity or they can lead to signs of partial cross-linking. This effect proves to be particularly disadvantageous when making alterations in the formulation, as a result of which it is not suitable for an online alteration of the formulation. Furthermore, plant components such as gear pumps, overflow valves and flow-measuring systems have proved to be very accident-sensitive and high-maintenance when handling highly viscous and reactive resins.

SUMMARY

The embodiments relate generally to a method for the intermittent production and continuous supply of a resin-filler mixture in the course of the production of plastic molded parts with or without fibers for reinforcement, at least portions of a resin being pre-mixed in the form of a premix and homogenized together with a filler and/or fibers in at least one extruder to form a resin-filler mixture and to an installation for the intermittent production and continuous supply of a resin-filler mixture in the course of the production of plastic molded parts with or without fibers for reinforcement, at least portions of the resin being pre-mixed in the form of a premix and homogenized together with a filler and/or fibers in an extruder to form a resin-filler mixture.

The object underlying the disclosed embodiments is to provide a method and an installation by means of which it is possible to ensure a continuous supply of a resin-filler mixture reliably and in continuous operation, an optimum and precise mixing ratio of the individual constituents of a resin-filler mixture (mostly consisting of a resin mixture and fillers) being ensured in which the components, particularly portions of very small or highly viscous components, are dispersed finely and uniformly. In particular, the aim is to optimize the production of the resin mixture for the supply of very small components and to achieve a continuous supply of the resin mixture that is reliable for continuous operation.

According to one embodiment, a method includes steps where individual portions of a predetermined premix are metered, gravimetrically regulated, under a primary pressure by way of metering valves from various storage tanks into a mixing drum for producing a premix, wherein a weighing device mounted on the mixing drum and a control or regulating device connected thereto adjusts and controls the amount of each individual portion of the premix during the metering process of the individual portions, wherein the individual introduced portions are subsequently or simultaneously mixed in the mixing drum with the aid of a stirring device to form a premix and this premix is delivered intermittently to a metering tank after sufficient mixing, and the metering tank meters the premix continuously during the preceding process steps by means of a second weighing device mounted on the metering tank and an associated second control or regulating device and a feed pump to at least one extruder for producing a resin-filler mixture, an additional premix being produced in the mixing drum during the continuous delivery of the premix to the extruder.

According to another embodiment, a method for intermittent production and continuous supply of a resin-filler mixture in the course of producing plastic molded parts with or without fibers for reinforcement, at least portions of a resin pre-mixed as a first premix and mixed with a filler and/or the fibers in at least one extruder to form the resin-filler mixture, the method comprising the steps of: metering components from storage tanks into a mixing drum in order to produce the first premix, wherein the components are gravimetrically regulated under a primary pressure by metering valves; adjusting and controlling an amount of the components metered into the mixing drum, wherein a first weighing device mounted on the mixing drum and a first control and regulating device connected to the first weighing device are configured to adjust and control the amount of the components metered; subsequently or simultaneously mixing the components with a stirring device in the mixing drum to produce the first premix; delivering the first premix intermittently to a metering tank; metering the first premix continuously from the metering tank during the preceding steps to at least one extruder to produce a resin-filler mixture using a second weighing device mounted on the metering tank, a second control or regulating device connected to the second weighing device, and a first feed pump; and producing a second premix in the mixing drum during the continuous metering of the first premix to the at least one extruder.

According to yet another embodiment, an installation for intermittent production and continuous supply of a resin-filler mixture in the course of producing plastic molded parts with or without fibers for reinforcement, at least portions of a resin pre-mixed and mixed with a filler and/or fibers in an extruder to form the resin-filler mixture, the installation comprising: first metering valves disposed above a mixing drum, wherein the first metering valves are configured to meter components under a primary pressure from storage tanks into the mixing drum; a first weighing device for the mixing drum and a first control or regulating device connected to the first control or regulating device, wherein the first weighing device and the first control or regulating device are configured to adjust and/or control the components metered by the first metering valves; a stirring device disposed in the mixing drum, wherein the stirring device is configured to mix the components; a second metering valve disposed on the mixing drum, wherein the second metering valve is configured to transfer a first premix into a metering tank intermittently or continuously; and a first feed pump, a second weighing device, and a second control or regulating device disposed to control or regulate a continuous discharge of the premix from the metering tank to at least one extruder.

According to yet another embodiment, an installation includes metering the portions under primary pressure into a mixing drum from various storage tanks, metering valves are disposed at a higher revel than the mixing drum, for the gravimetric metering of the portions, a weighing device for the mixing drum and a control or regulating device connected thereto are disposed for adjusting and/or controlling the amount of the portions metered by means of the metering valves, a stirring device is mounted for mixing the individually introduced portions in the mixing drum, a metering valve is disposed on the mixing drum for the intermittent and direct transfer of the premix into a metering tank, and a feed pump, a weighing device and an associated second control or regulating device are disposed for controlling or regulating the continuous discharge of the premix from the metering tank to at least one extruder.

The installation may also include being able to be operated on its own without implementing the method of the invention for producing filled, additive-supplemented and/or reinforced plastics, preferably fiber-reinforced plastics.

The method provides several advantages over the prior art. It is possible to produce a resin-filler mixture (made of a resin mixture and fillers) which can be used in the continuous direct process, for example, in the production of fiber-reinforced molded parts without being stored intermediately for the maturing process. For this purpose, a premix is initially produced from various resin components, additives and hardeners in a novel mixing system, which premix is then added to an extruder into which the thickening agents and fillers are supplied independently of the addition of the premix, and the premix is mixed here with long fibers and compounded to form a long fiber-reinforced and filled resin formulation, discharged by means of a forming die and pressed directly in a press to form molded parts. In doing so, the composition and mixing ratio of the individual constituents are adjusted precisely such that the selection of a production process in the direct process (without storage) does not involve any maturing period, but instead the resin formulation is pressed directly after its production. SMC can thus be produced directly on site from the necessary materials and need no longer be produced centrally at mostly remote production sites, stored there and delivered punctually to the customer following the maturing period so that the customer can use the matured sheet molding compounds.

The producer of molded parts is now able to produce plastic molded parts, especially SMC molded parts, directly on the presses required for the processing, it being also possible to produce different mixtures depending on the application. Accordingly, the problems posed by a warehouse-supported material supply in terms of oversupply and undersupply of goods in stock are completely eliminated.

The suggested installation at least provides the following advantages:

an increase in plant flexibility is possible by means of a rapid and particularly uncomplicated change in formulations, an optimum and targeted metering of even very small components is possible by means of multiple regulation and monitoring, the installation engineering and plant availability can be improved and downtimes can be reduced by the use of low-wear components and valve technology and particularly by dispensing with sensor systems that are in direct contact with the resin mixture and the individual components, the installation as a whole is also suitable for metering inflammable and explosive liquids, only a small region (at least mixing drum and metering tank) must be encapsulated to render it explosion-proof, components containing styrene can be processed easily, vulnerable and optionally extremely imprecise pumps can be dispensed with except for the extruder input and the metering of solids, high production reliability is ensured with respect to ensuring the necessary quantity and quality, the method and the installation can be used flexibly and for delivering optimum—results in the case of a plurality of different mixing ratios, a change to other variants or formulations of the mixtures is possible online without significant loss of time or material with simultaneous direct usability on site (in the case of a molding press), the extrudate produced from the resin-filler mixture with the appropriate plasticity and in consistent quality can be supplied to an SMC direct process of further processing to form fiber-reinforced thermosetting molded parts or used within the scope of a semi-finished product direct process.

The mixing drum and/or the metering tank can be equipped with a high-precision weighing device. By virtue of the fact that the portions are weighed in the static state, the metering accuracy is very high. The high metering accuracy is promoted by the fact that the individual components are present at the valves under a primary pressure which is preferably caused by the weight force. Depending on the arrangement, condition of the components or in the case of a major industrial application, it may make sense to have additional feed pumps in the supply lines to increase, apply or precisely regulate the primary pressure.

On the whole, the separation of the continuous metering of the resin mixture and additional admixtures to an extruder from an intermittent production of a resin mixture with simultaneous weighing and mixing assists in the high-precision production of the resin mixture or the subsequently producible resin-filler mixture. In spite of short-term interruptions at the metering valves, the stirring device or a no-load operation of the storage tanks, the installation as a whole can be operated further as long as a remainder of the premix is still present in the metering tank. Even a cleaning or a change of the mixing tank is possible during continued or particularly changed production. The dosage is advantageously carried out in the mixing tank by means of the metering valves for different nominal sizes and different viscosities. Advantageously, standard parts are preferably used that have standardized interfaces for the control or regulating devices in the case of changes or renovations of the installation. The smallest components are preferably metered using sensitive metering valves of a small nominal size. The valves are preferably multi-stage or continuously adjustable. The control or regulating device monitors the metered addition with the aid of the signal of the weighing device. Shortly before the target quantity is reached, the flow rate of the metering valve is preferably throttled in order ensure that the target value is reached as precisely as possible.

Additional advantageous measures and embodiments will become apparent from the dependent claims and the following description of the drawings. It is to be understood, however, that both the foregoing general description and the following detailed description are exemplary and explanatory only, and are not restrictive of the embodiments as claimed.

BRIEF DESCRIPTION OF THE DRAWINGS

These and other features, aspects, and advantages of the present embodiments will become apparent from the following description, appended claims, and the accompanying exemplary embodiments shown in the drawings, which are briefly described below.

DETAILED DESCRIPTION OF THE PREFERRED EMBODIMENTS

Figure 1:
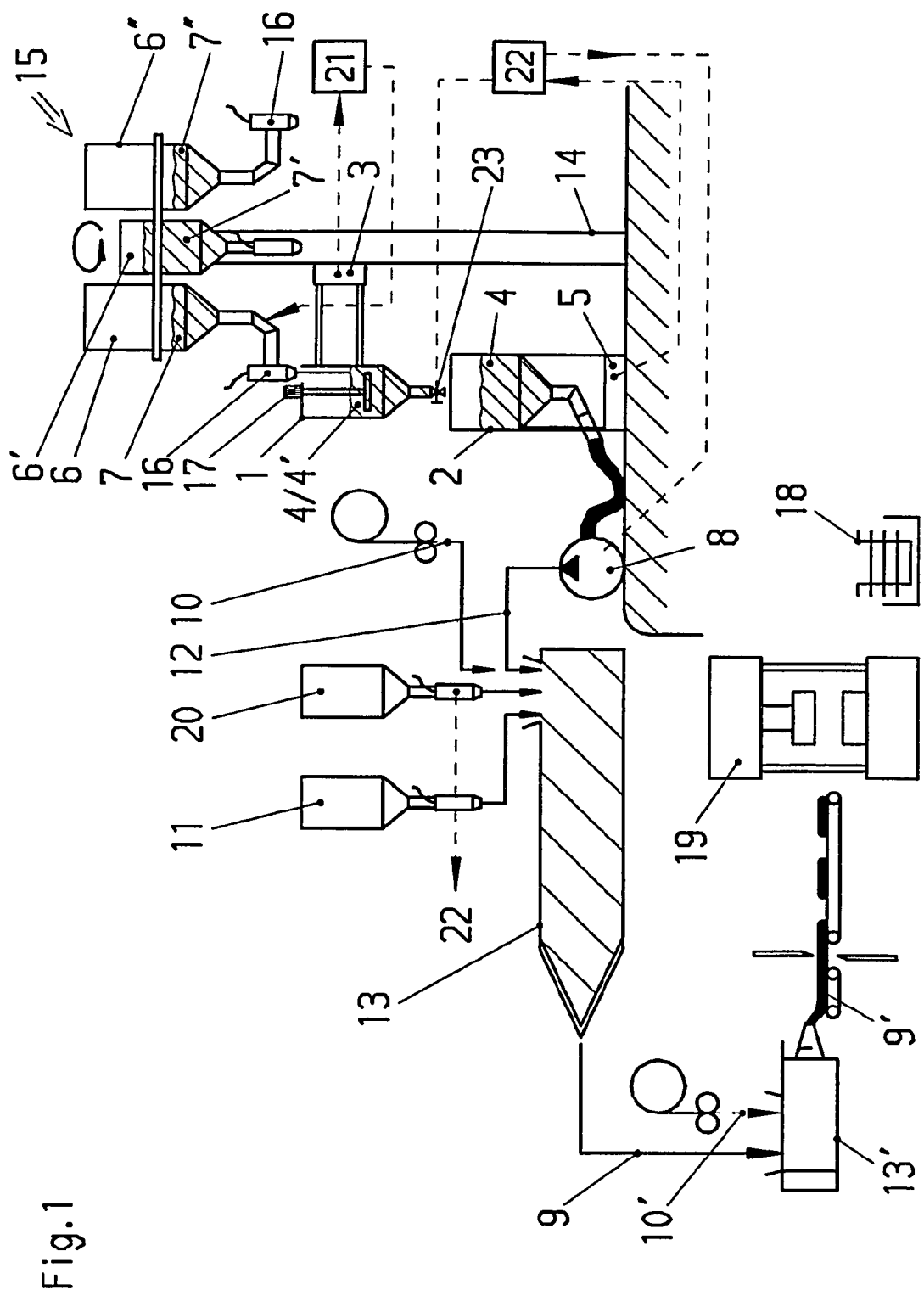
FIG. 1 is a diagrammatic illustration of an installation for producing fiber-reinforced resin-filler mixtures, which installation comprises a turret for the storage tanks and an alternate discharge from the storage tanks.

Presently preferred embodiments are illustrated in the drawings. An effort has been made to use the same or like reference numbers throughout the drawings to refer to the same or like parts.

Figure 2:
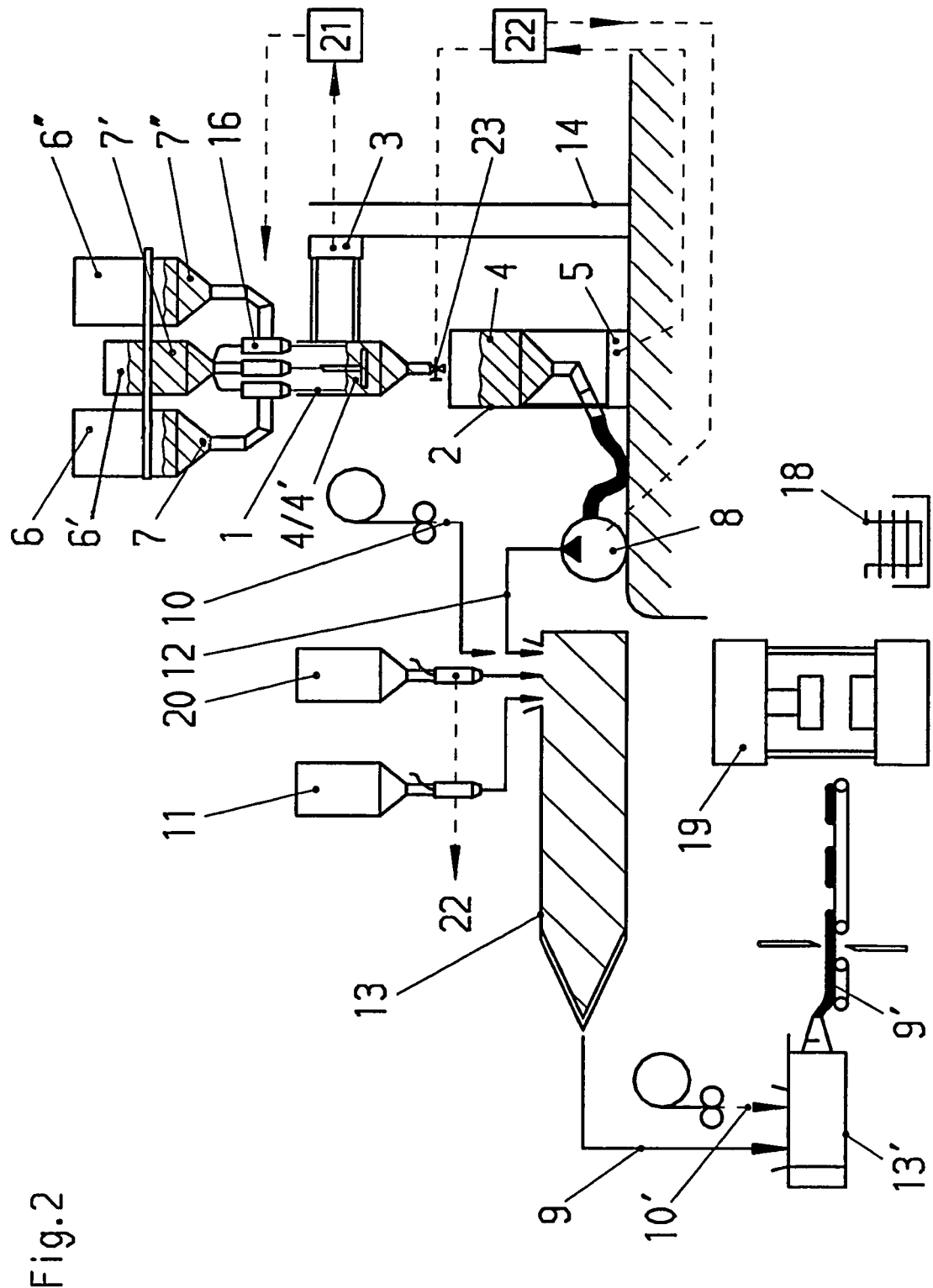
FIG. 2 shows an installation shown in FIG. 1 comprising a metering stand and, partially, a simultaneous discharge from the storage tanks shown in FIG. 1.
Figure 3:
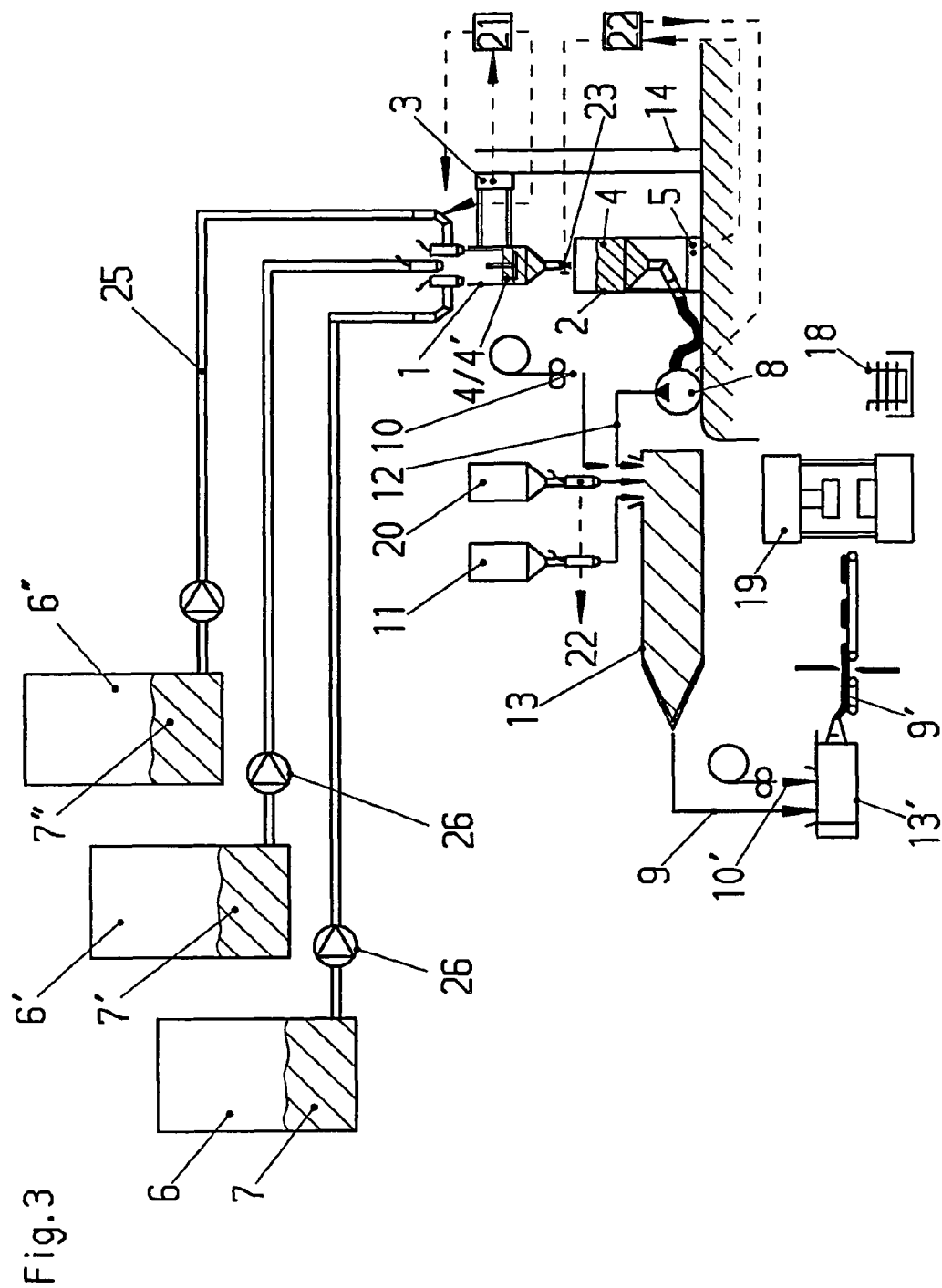
FIG. 3 is a diagrammatic illustration of an installation comprising additional external storage tanks and corresponding supply pipes and optional pumps, required for example, during major industrial production.

In FIGS. 1 to 3, the installation can be divided diagrammatically into three regions:
- a turret 15 on a stand 14 (FIG. 1), a metering stand comprising individual-component supplies to be metered (FIG. 2) or a centralized mounting of the storage tanks, preferably above the mixing drum 1, or the metering valves 16 or first metering valves 16 for producing a premix 4, 4' or a first premix 4, 4',
- a metering tank 2, which is disposed below the mixing drum 1 and comprises a feed pump 8 or a metering pump 8 or a first feed pump 8 for the continuous discharge of the premix 4 into an extruder and
- a production area comprising at least one extruder and a diagrammatic and exemplary illustration of a possible direct SMC process for producing plastic-molded parts 18 using a press or a molding press 19.

The process flow according to FIGS. 1 to 3 is as follows: Various portions 7, 7', 7'' ... 7''' or components 7, 7', 7'' ... 7''' are filled from storage tanks 6, 6', 6'' ... 6''' (both in any desired or necessary number) into an initially empty mixing drum 1 in a controlled form by means of metering valves 16 that can be preferably formed as multi-stage and/or spill-proof valves. For accurately metering the quantities of the portions 7, 7', 7'', a weighing device or a first weighing device 3 weighs the mixing drum 1 or the quantity of the respective portion 7, 7', 7'' introduced and delivers the corresponding values to a control or regulating device 21 or a first control or regulating device 21 for controlling or regulating the metering valves 16. The control or regulating device 21 preferably comprises a programmable logic device, into which various formulations for premixes are programmed, it being possible to initially introduce relatively large portions 7, 7', 7'' of the premix 4, in terms of quantity, into the mixing drum 1. As shown in FIG. 1, defined or all portions 7, 7', 7'' are successively introduced (FIG. 1) into the mixing drum 1 for highly accurate metering, or are introduced, partly or entirely, almost simultaneously (FIG. 2) into the mixing drum 1. In a possible alternative, during major industrial production, the portions 7, 7', 7'' are stored in farther removed, possibly temperature-controlled and/or secure storage tanks 6, 6', 6'' and supplied, as shown in FIG. 3, by means of supply pipes 25 comprising optional feed pumps 26 or second feed pumps 26, to the metering equipment—the controlled or regulated metering valves 16. In a further alternative application, storage tanks 6, 6', 6'' of a controllable size can be weighed during the discharge of the portions 7, 7', 7'' and this measured weight value is used for controlling the metering process or the metering valves 16. Advantageously, this is possible in the method and the installation shown in FIG. 2 in which several portions 7, 7', 7'' can or should be introduced simultaneously. This possibility is necessary, for example, when a high clock rate is required for premixes 4' to be produced. In a special exemplary embodiment, it makes sense to use a combination of this possibility, in which preferably larger quantities or more easily metered large volumes of the portions 6, 6', 6'' are introduced simultaneously and smaller components, in terms of quantity, are metered successively and one at a time, and measured by means of the weighing device 3 or the first weighing device 3 on the mixing drum 1.

At the same time as or on completion of the introduction of all portions 7, 7', 7'', the contents of the mixing drum 1 are stirred by means of a stirring device 17 to obtain a proper mixture. After all carefully added portions 7, 7', 7'' have been mixed, a premix 4 thus results that is then transferred by means of a metering valve 23 or a second metering valve 23 disposed at the base of the mixing drum 1 into the metering tank 2. In doing so, the quantity of the premix 4 is controlled by means of a weighing device or a second weighing device 5, and the metering valve 23 is preferably controlled or regulated by means of a control or regulating device 22 or a second control or regulating device 22. While the production of a new premix 4' is started in the emptied mixing drum 1, the quantity of premix 4 or first premix 4 present in the metering tank 2 can be supplied continuously by means of a feed pump 8 to an extruder 13.

The advantage of the method and the first two areas of the installation is that an intermittently producible and thus accurately metered premix 4 is transferred in a continuous work process that continuously supplies a premix 4 to an extruder 13. At the same time, it enables the other portions such as fillers 11 and/or thickening agent 20 to be supplied optimally and likewise continuously to an extruder 13, and to several extruders 13, 13' one after the other if a multi-extruder system is used. The speed and quantity of premix 4 in relation to the other components to be added is determined by the desired ratios in the resin-filler mixture 9 to be produced. The control or regulating actions required for this purpose can be synchronized by the control or regulating device 22 or an additional control or regulating device (not shown). It is clear that extensive control and/or regulating activities must be carried out for this purpose so that the individual components are optimally attuned to each other when they enter the extruder 13 or optionally the subsequent extruders 13' in the case of a multi-extruder system.

Alternatively, during the transfer of the premix 4, fibers 10 can be introduced into the extruder 13 in the form of short and/or long fibers or glass fibers for the purpose of fiber reinforcement, or the fibers 10' can be introduced in an appropriately metered form into an additional extruder 13' only after a complete and optimum stirring of the resin-filler mixture 9 for the production of a resin-filler mixture 9'. It should be emphasized that the individual components of the resin-filler mixture 9, 9' should be supplied into the extruder in the respective adjustable ratio in relation to each other, which ratio is determined technically by the application or the subsequent intended use of the resin-filler mixture 9, 9'. If necessary, in an SMC direct process, the fiber-reinforced resin-filler mixture 9, 9' can be transferred for an additional use after the first or the second extruder 13, 13' and discharged by means of a die, by way of example. After being cut to size, which may be necessary, the fiber-reinforced resin-filler mixture 9, 9' can then be pressed in a press 19 to form a plastic-molded part 18 or it is stored until use depending on the options available.

The exact metering of the premix 4 in relation to the other components such as fillers 11 and/or thickening agent 20 is now simplified since these days, larger quantities of materials to be metered can easily be metered to each other using suitable conveying means (metering pumps). The metering of the smallest quantities of additives to a resin or to the premix 4 is transformed into an intermittently operating, easily regulated and verifiable work step and can now be controlled easily and optimally even for the addition of highly viscous and/or very small amounts of components.

The discharge from the metering tank 2 into the extruder 13 can be controlled or regulated volumetrically and/or gravimetrically by means of the or an additional control or regulating device 22, preferably likewise comprising a programmable logic device.

It is apparent from FIG. 3 that for the supply of the portions 7, 7', 7" by means of the metering valves 16, feed pumps 26 are disposed in the supply pipes 25 of the storage tanks 6, 6', 6" ... 6‴. Alternately or additionally, for metering the portions 7, 7', 7" ... 7‴, the storage tanks 6, 6', 6" ... 6‴ are disposed, in terms of their hydrostatic height, above the mixing drum 1. In both cases or in the combination case, there results a primary pressure at the metering valves 16, which primary pressure is advantageously sufficient for an optimized and controllable speed of the portions through the metering valves. This results in a reduction of components and devices and fewer pressure fluctuations in the lines or in the storage tanks occur.

For the definition of the terminology, it should be noted that it is not only fillers that are introduced into the extruder but also other components (such as resins, additives or the like) can be introduced into the extruder. There exists a premix consisting, for example, of at least one resin, at least one hardener, at least one primer, at least one inhibitor and/or at least one additive. Examples of fillers are chalk, wood dust or similar materials that substantially increase the volume of the premix; they are to be initially introduced only into the extruder 13, but can also be introduced, at least in part, into the mixing drum 2 for better handling of the premix and for increasing the volume of the same.

Figure 4:
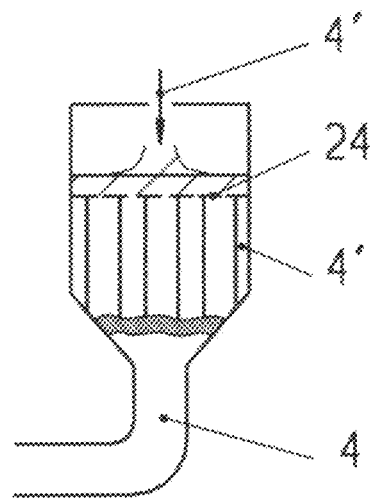
FIGS. 4-6 are enlarged illustrations of the metering tank as an interface between the intermittently and continuously operating methods with various variants for the controlled discharge of an additional premix.
Figure 5:
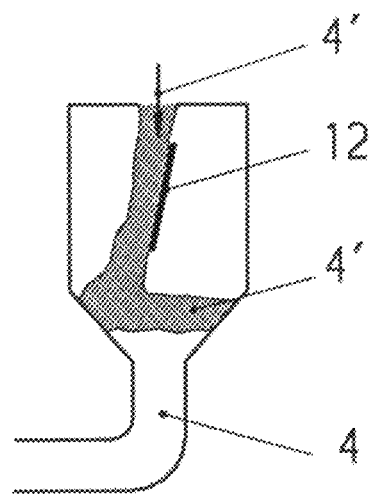
Figure 6:
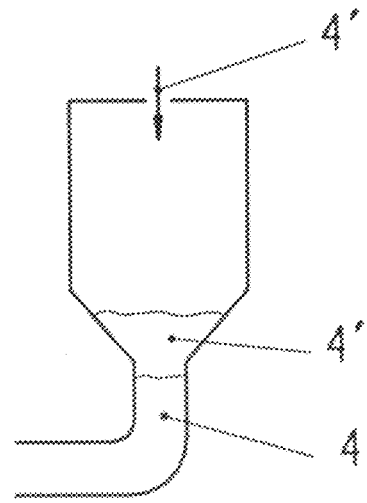

As shown in FIGS. 4 to 6, a newly finished premix 4' is introduced from the mixing drum 1 into the metering tank 2 advantageously before, during or after the emptying process of the entire metering tank 2. The latter can likewise be used for introducing an altered premix 4' into the process. This premix 4' can be colored differently in order to indicate to any operating personnel the arrival of the new premix 4'. Preferably, during the transfer of the premix 4 from the mixing drum 1 into the metering tank 2, the removal of the premix 4 from the metering tank 2 by means of the metering pump 8 is changed to a volumetric metering for this period of time. Alternately, during the transfer of the premix 4 from the mixing drum 1 into the metering tank 2, the removal of the premix 4 from the metering tank 2 by means of the metering pump 8 is adjusted, with respect to the delivery volume, for this period of time to an average value of a preceding period of time.

The transfer of an additional premix 4' from the mixing drum 1 into the metering tank 2 is carried out in such a way, particularly in the case of a change in the mixing ratio of the portions 7 in relation to each other and/or the addition of new and/or other portions 7, that the transferred premix substantially does not mix with the older premix 4 sill present in the metering tank 2.

It is understandable that if the premix 4 has the same formulation as the premix 4', the metering tank 2 need not be transferred in an empty or almost empty state; but instead the metering tank 2 in a preferred embodiment can also be refilled appropriately faster in the case of the same formulations.

In order to prevent the different premixes 4 and 4' from mixing with each other, separating agents such as a sieve 24 as shown in FIG. 4 or a baffle plate 12 as shown in FIG. 5 can be provided in the metering tank 2. The separating agents prevent the premix 4' from flowing too rapidly into the metering tank 2 and thus causing the two premixes 4 and 4' to mix with each other.

The point in time of the transfer of a new premix 4' from the mixing drum 1 into the metering tank 2 is preferably determined depending on the value of a level measurement or the quantity of the older premix 4 still present in the metering tank 2. The level measurement can preferably be carried out by means of the weighing device 5 and/or an acoustic discharge measurement (not shown) and/or a hydrostatic sensor (not shown).

The point in time of the transfer can also be determined by means of the actually discharged quantity of the premix 4 that can be calculated or detected by the control or regulating device 22. This can be determined, for example, by means of the quantity actually delivered by the feed pump 8. As shown in FIG. 6, a subsequent premix 4' can also be incorporated into the metering tank 2 only when the fill level of the older premix 4 has reached the lowest end, preferably in a conical region, of the metering tank or in the continuing line. Deaerating means may be provided in the continuing line, which deaerating means are preferably not required during a gravimetric discharge.

Exemplary Embodiments

According to a first embodiment, a method for the intermittent production and continuous supply of a resin-filler mixture 9 in the course of the production of plastic molded parts 18 with or without fibers 10 for reinforcement, at least portions 7, 7', 7" ... 7‴ of the resin being pre-mixed in the form of a premix 4 and homogenized together with a filler 11 and/or fibers 10 in at least one extruder 13, 13' to form a resin-filler mixture 9, 9', which method is characterized by the following features: the individual portions 7, 7', 7" ... 7‴ of a predetermined premix 4, 4' are metered, gravimetrically regulated, under a primary pressure by way of metering valves 16 from various storage tanks 6, 6', 6" ... 6‴ into a mixing drum 1 for producing a premix 4, 4', wherein a weighing device 3 mounted on the mixing drum 1 and a control or regulating device 21 connected thereto adjusts and controls the amount of each individual portion 7, 7', 7" ... 7‴ of the premix 4, 4' during the metering process of the individual portions 7, 7', 7" ... 7", wherein the individual introduced portions 7, 7', 7" ... 7" are subsequently or simultaneously mixed in the mixing drum 1 with the aid of a stirring device 17 to form a premix 4, 4' and this premix 4, 4' is delivered intermittently to a metering tank 2 after sufficient mixing, and the metering tank 2 meters the premix 4 continuously during the preceding process steps by means of a second weighing device 5 mounted on the metering tank 2 and an associated second control or regulating device 22 and a feed pump 8 to at least one extruder 13, 13' for producing a resin-filler mixture 9, an additional premix 4' being produced in the mixing drum 1 during the continuous delivery of the premix 4 to the extruder 13.

According to a second embodiment, a method according to the first embodiment characterized in that the primary pressure at the metering valves 16 for metering the portions 7, 7', 7" ... 7" is applied by means of feed pumps 25 and/or storage tanks 6, 6', 6" ... 6" located hydrostatically at a higher level than the metering valves 16.

According to a third embodiment, the method according to the first embodiment or the second embodiment, characterized in that that the portions 7, 7', 7" ... 7" of the premix 4, 4' are supplied to the mixing drum 1 at least partly simultaneously, successively and/or in a predetermined order.

According to a fourth embodiment, the method according to the first embodiment, characterized in that the continuous feed from the metering tank 2 into the extruder 13, 13' is controlled or regulated gravimetrically or volumetrically.

According to a fifth embodiment, the method according to one or more of the preceding embodiments characterized in that, during the transfer of the premix 4 from the mixing drum 1 into the metering tank 2, the removal of the premix 4 from the metering tank 2 by means of the metering pump 8 is changed to a volumetric metering for this period of time.

According to a sixth embodiment, the method according to one or more of the preceding embodiments characterized in that, during the transfer of the premix 4 from the mixing drum 1 into the metering tank 2, the removal of the premix 4 from the metering tank 2 by means of the metering pump 8, the metering pump 8 is adjusted for this period of time to an average value of a preceding period of time according to the amount to be transferred.

According to a seventh embodiment, the method according to one or more of the preceding embodiments characterized in that the premix 4 is continuously transferred into an extruder 13 and the filler 11 and/or a thickening agent 20 is supplied according to ratio specifications relating to quantity or weight.

According to a eighth embodiment, the method according to one or more of the preceding embodiments characterized in that fibers 10 are supplied continuously to a first extruder 13 or to an additional second extruder 13' in the form of short and/or long fibers.

According to a ninth embodiment, the method according to one or more of the preceding embodiments characterized in that a transfer of an additional premix 4 from the mixing drum 1 into the metering tank 2 is carried out in such a way, particularly in the case of a change in the mixing ratio of the portions 7 in relation to each other and/or the addition of new and/or other portions 7, that no mixing substantially takes place with the older premix 4 still present in the metering tank 2.

According to a tenth embodiment, the method according to one or more of the preceding embodiments characterized in that the point in time of the transfer of a new premix 4' from the mixing drum 1 into the metering tank 2 is determined depending on the value of a level measurement and/or a measured actual discharge quantity of the older premix 4 in the metering tank 2.

According to a eleventh embodiment, the method according to one or more of the preceding embodiments characterized in that the level measurement is carried out by means of the weighing device 5 and/or an acoustic discharge measurement and/or a hydrostatic sensor, and/or the control or regulating device detects or calculates the actually delivered quantity of older premix 4.

According to a twelfth embodiment, the method according to one or more of the preceding embodiments characterized in that the large portions 7, 7', 7" ... 7" of the premix 4 in terms of quantity are initially metered into the mixing drum 1 before smaller or very few portions 7, 7', 7" ... 7" in terms of quantity are metered into the mixing drum 1.

According to a thirteenth embodiment, the method according to one or more of the preceding embodiments characterized in that the portions 7, 7', 7" ... 7" of the premix 4 are discharged from the storage tanks 6, 6', 6" ... 6" by means of feed pumps 26 and supplied to the metering valves 16.

According to a fourteenth embodiment, the method according to one or more of the preceding embodiments characterized in that multi-stage and/or spill-free valves are used as metering valves 16.

According to yet a fifteenth embodiment, an installation for the intermittent production and continuous supply of a resin-filler mixture 24 in the course of the production of plastic molded parts 18 with or without fibers 10 for reinforcement, at least portions 7, 7', 7" ... 7" of the resin being pre-mixed in the form of a premix 4 and homogenized together with a filler 11 and/or fibers 10 in an extruder 13, 13' to form a resin-filler mixture 9, which installation is characterized in that, for metering the portions 7, 7', 7" ... 7" under primary pressure into a mixing drum 1 from various storage tanks 6, 6', 6" ... 6", metering valves 16 are disposed at a higher level than the mixing drum 1, for the gravimetric metering of the portions 7, 7', 7" ... 7", a weighing device 3 for the mixing drum 1 and a control or regulating device 21 connected thereto are disposed for adjusting and/or controlling the amount of the portions 7, 7', 7" ... 7" metered by means of the metering valves 16, a stirring device 17 is mounted for mixing the individually introduced portions 7, 7', 7" ... 7" in the mixing drum 1, a metering valve 23 is disposed on the mixing drum 1 for the intermittent and direct transfer of the premix 4 into a metering tank 2, and a feed pump 8, a weighing device 5 and an associated second control or regulating device 22 are disposed for controlling or regulating the continuous discharge of the premix 4 from the metering tank 2 to at least one extruder 13, 13'.

According to a sixteenth embodiment, the installation according to the fifteenth embodiment characterized in that means for the controlled addition at least of filler 11 and/or a thickening agent 20 and/or other components according to ratio specifications relating to quantity or weight are disposed in the region of the inlet opening of the extruder 13.

According to a seventeenth embodiment, the installation according to one or more of the fifteenth to sixteenth embodiments characterized in that means for the controlled supply of fibers 10 in the form of short and/or long fibers are disposed on the first 13 or an additional second extruder 13.

According to an eighteenth embodiment, the installation according to one or more of the fifteenth to the seventeenth embodiments characterized in that, for a primary pressure at the metering valves 16 for metering the portions 7, 7', 7" ... 7", feed pumps 26 are disposed in the supply pipes 25 from the storage tanks 6, 6', 6" ... 6" and/or the storage tanks 6, 6', 6" ... 6" are disposed, in terms of their hydrostatic height, above the mixing drum 1 and/or the metering valves 16.

According to a nineteenth embodiment, the installation according to one or more of the fifteenth to the eighteenth embodiments characterized in that at least two-stage or multi-stage and/or spill-proof valves are disposed as metering valves 16 on the storage tanks 6, 6', 6" ... 6".

According to a twentieth embodiment, the installation according to one or more of the fifteenth to the nineteenth embodiments characterized in that a modifiable logic device is disposed in the control or regulating devices 21, 22.

According to a twenty-first embodiment, the installation according to one or more of the fifteenth to the twentieth embodiments characterized in that separating agents are provided in the metering tank 2 for preventing a new premix 4' from mixing with an older premix 4.

According to a twenty-second embodiment, the installation according to the twenty-first embodiment characterized in that the separating agents are formed as a baffle plate 12 or a sieve 25.

According to a twenty-third embodiment, a method for intermittent production and continuous supply of a resin-filler mixture in the course of producing of plastic molded parts with or without fibers for reinforcement, at least portions of a resin pre-mixed as a first premix and mixed with a filler and/or the fibers in at least one extruder to form the resin-filler mixture, the method comprising the steps of: metering components included in storage tanks into a mixing drum in order to produce the first premix, wherein during the metering step, metering valves exert a primary pressure on the components to gravitemetrically regulate the components; adjusting and controlling the amount of the components metered into the mixing drum, wherein a first weighing device mounted on the mixing drum and a first control and regulating device connected to the first weighing device are configured to adjust and control the amount of the components metered; mixing the components included in the mixing drum to produce the first premix intermittently or simultaneously, wherein a stirring device mixes the components; delivering the first premix intermittently to a metering tank; and metering the first premix continuously during the preceding steps to at least one extruder to produce a resin-filler mixture using a second weighing device mounted on the metering tank, a second control or regulating device connected to the second weighing device, and a feed pump, and wherein a second premix is produced in the mixing drum during the continuous metering of the first premix to the extruder.

According to a twenty-fourth embodiment, the method according to the twenty-third embodiment, wherein the first feed pump and/or storage tanks are configured to apply the primary pressure and wherein the first feed pump and/or the storage tanks are positioned above the metering valves.

According to a twenty-fifth embodiment, the method according to the twenty-third embodiment, wherein the step of metering the components includes metering the components into the mixing drum simultaneously, successively or in a predetermined order.

According to a twenty-sixth embodiment, the method according to the twenty-third embodiment, further comprising gravitemetrically or volumetrically controlling or regulating the first premix metered to the at least one extruder from the metering tank.

According to a twenty-seventh embodiment, the method according to the twenty-third embodiment, wherein during the step of delivering the first premix to the metering tank, the step of metering the first premix includes changing to volumetrically metering the first premix from the metering tank.

According to a twenty-eight embodiment, the method according to the twenty-third embodiment, wherein during the step of delivering the first premix to the metering tank, the step of metering the first premix includes adjusting a volume of the first premix metered during a period of time from the metering tank by the first feed pump to an average value of a preceding period of time.

According to a twenty-ninth embodiment, the method according to the twenty-third embodiment, further comprising continuously delivering the first premix to the at least one extruder and delivering a filler and/or a thickening agent to the at least one extruder according to ratio specifications relating to quantity or weight.

According to a thirtieth embodiment, the method according to the twenty-third embodiment, further comprising continuously supplying short and/or long fibers to a first extruder or to a second extruder.

According to a thirty-first embodiment, the method according to the twenty-third embodiment, further comprising metering an additional first premix from the mixing drum to the metering tank such that when changing a mixing ratio of components in relation to each other and/or the addition of new and/or other components, no mixing substantially takes place with the first premix still included in the metering tank.

According to a thirty-second embodiment, the method according to the thirty-first embodiment, wherein the step of metering the additional first premix from the mixing drum includes metering the additional first premix based on a value of a level measurement and/or a measured actual discharge quantity of the first premix in the metering tank.

According to a thirty-third embodiment, the method according to the thirty-first embodiment, wherein the step of metering the additional first premix from the mixing drum includes metering the additional first premix based on a value of a level measurement and/or a measured actual discharge quantity of the first premix in the metering tank.

According to a thirty-fourth embodiment, the method according to the thirty-third embodiment, wherein the step of metering the additional first premix includes performing the level measurement using the second weighing device and/or an acoustic discharge measurement and/or a hydrostatic sensor, and/or detecting or calculating an amount of the first premix metered using the first control or regulating device.

According to a thirty-fifth embodiment, the method according to the twenty-third embodiment, wherein the step of metering the components includes metering large amounts of the components to the mixing drum before metering small amounts of the components to the mixing drum.

According to a thirty-sixth embodiment, the method according to the twenty-third embodiment, further comprising pumping the components from the storage tanks and supplying the components to the metering valves, wherein a second feed pump is configured to pump the components.

According to a thirty-seventh embodiment, the method according to the twenty-third embodiment, wherein the metering valves include multi-stage and/or spill-free valves.

According to a thirty-eighth embodiment, an installation for intermittent production and continuous supply of a resin-filler mixture in the course of producing plastic molded parts with or without fibers for reinforcement, at least portions of a resin pre-mixed and mixed with a filler and/or fibers in an extruder to form the resin-filler mixture, the installation comprising: first metering valves disposed above a mixing drum, wherein the first metering valves are configured to meter components under a primary pressure from storage tanks into the mixing drum; a first weighing device for the mixing drum and a first control or regulating device connected to the first control or regulating device, wherein the first weighing device and the first control or regulating device are configured to adjust and/or control the components metered by the first metering valves; a stirring device disposed in the mixing drum, wherein the stirring device is configured to mix the components; a second metering valve disposed on the mixing drum, wherein the second metering valve is configured to transfer a first premix into a metering tank intermittently or continuously; and a first feed pump, a second weighing device, and a second control or regulating device disposed to control or regulate a continuous discharge of the premix from the metering tank to at least one extruder.

According to a thirty-ninth embodiment, the installation according to the thirty-eight embodiment, further comprising a metering device disposed in a region of an inlet opening of the at least one extruder, wherein the metering device is configured to control addition of at least a filler and/or a thickening agent and/or additional components to the at least one extruder according to ratio specifications relating to quantity or weight.

According to a fortieth embodiment, the installation according to the thirty-eight embodiment, further comprising a metering device disposed on the at least one extruder or an additional extruder, wherein the metering device is configured to control supply of short and/or long fibers into the at least one extruder or the additional extruder.

According to a forty-first embodiment, the installation according to the thirty-eighth embodiment, further comprising second feed pumps disposed in the supply pipes from storage tanks and/or storage tanks disposed according to their hydrostatic height above the mixing drum and/or the first metering valves, such that a primary pressure can be created at the first metering valves.

According to a forty-second embodiment, the installation according to the thirty-eighth embodiment, further comprising two-stage or multi-stage valves and/or spill-proof valves disposed as first metering valves on the storage tanks.

According to a forty-third embodiment, the installation according to the thirty-eight embodiment, wherein the first control or regulating device includes a modifiable logic device.

According to a forty-fourth embodiment, the installation according to the thirty-eighth embodiment, further comprising separating agents provided in the metering tank, wherein the separating agents are configured to prevent an additional premix from mixing with the first premix.

According to a forty-fifth embodiment, the installation according to the forty-fourth embodiment, wherein the separating agents include a baffle plate or a sieve.

The construction and arrangement of the installation, as shown in the various exemplary embodiments, is illustrative only. Although some embodiments have been described in detail in this disclosure, many modifications are possible without materially departing from the novel teachings and advantages of the subject matter described herein. Other substitutions, modifications, changes and omissions may also be made in the design, operating conditions and arrangement of the various exemplary embodiments without departing from the scope of the present disclosure.

What is claimed is:

1. A method for intermittent production and continuous supply of a resin-filler mixture in a course of producing plastic molded parts with or without fibers for reinforcement, at least portions of a resin pre-mixed as a first premix and mixed with 1) a filler with fibers, or 2) a filler without fibers in at least one extruder to form the resin-filler mixture, the method comprising the steps of:

metering components from storage tanks into a mixing drum in order to produce the first premix, wherein the components are gravimetrically regulated under a primary pressure by metering valves;

adjusting and/or controlling an amount of the components metered into the mixing drum, wherein a first weighing device mounted on the mixing drum is configured to weigh the mixing drum to determine a weight of components metered from the storage tanks, and a first control or regulating device connected to the first weighing device is configured to adjust and/or control a metering valve of each storage tank that regulates the amount of the components metered from the storage tank;

subsequently or simultaneously mixing the components with a stirring device in the mixing drum to produce the first premix;

delivering the first premix intermittently to a metering tank;

metering the first premix continuously from the metering tank during the preceding steps to the at least one extruder to produce the resin-filler mixture using a second weighing device mounted on the metering tank, a first feed pump, and a second control or regulating device connected to the second weighing device and configured to adjust and/or control a metering valve of the mixing drum and the first feed pump to gravimetrically or volumetrically control or regulate the amount of the first premix metered from the metering tank;

producing a second premix in the mixing drum during the continuous metering of the first premix to the at least one extruder; and delivering the second premix intermittently to the metering tank.

2. The method according to claim 1, wherein each storage tank is in fluid communication with a storage tank feed pump, and the storage tanks and their corresponding storage tank feed pumps are positioned at different hydrostatic heights above the metering valves.

3. The method according to claim 1, wherein the step of metering the components includes metering the components into the mixing drum simultaneously, successively or in a predetermined order.

4. The method according to claim 1, wherein during the step of delivering the first premix to the metering tank, the step of metering the first premix includes changing to volumetrically metering the first premix from the metering tank.

5. The method according to claim 1, wherein during the step of delivering the first premix to the metering tank, the step of metering the first premix includes adjusting a volume of the first premix metered during a period of time from the metering tank by the first feed pump to an average value of a preceding period of time.

6. The method according to claim 1, further comprising continuously delivering the first premix to the at least one extruder and delivering a filler and/or a thickening agent to the at least one extruder according to ratio specifications relating to quantity or weight.

7. The method according to claim 1, further comprising continuously supplying short and/or long fibers to a first extruder or to a second extruder.

8. The method according to claim 1, further comprising a separating device provided in the metering tank, wherein when the second premix comprises a different mixing ratio of components in relation to each other and/or addition of new and/or other components as compared to the first premix, no substantial mixing of the second premix with the first premix still included in the metering tank takes place.

9. The method according to claim 8, wherein the step of metering the second premix from the mixing drum includes metering the second premix based on a value of a level measurement and/or a measured actual discharge quantity of the first premix in the metering tank.

10. The method according to claim 9, wherein the step of metering the second premix includes performing the level measurement using the second weighing device and/or an acoustic discharge measurement and/or a hydrostatic sensor, and/or detecting or calculating an amount of the first premix metered using the first control and regulating device.

11. The method according to claim 1, wherein the step of metering the components includes metering large amounts of the components to the mixing drum before metering small amounts of the components to the mixing drum.

12. The method according to claim 1, further comprising pumping the components from the storage tanks and supplying the components to the metering valves, wherein a second feed pump is configured to pump the components.

13. The method according to claim 1, wherein the metering valves include multi-stage and/or spill-free valves.

14. The method according to claim 1, wherein the second premix has a same composition as a composition of the first premix.

15. The method according to claim 1, wherein the second premix has a different composition as a composition of the first premix.

* * * * *